April 21, 1959

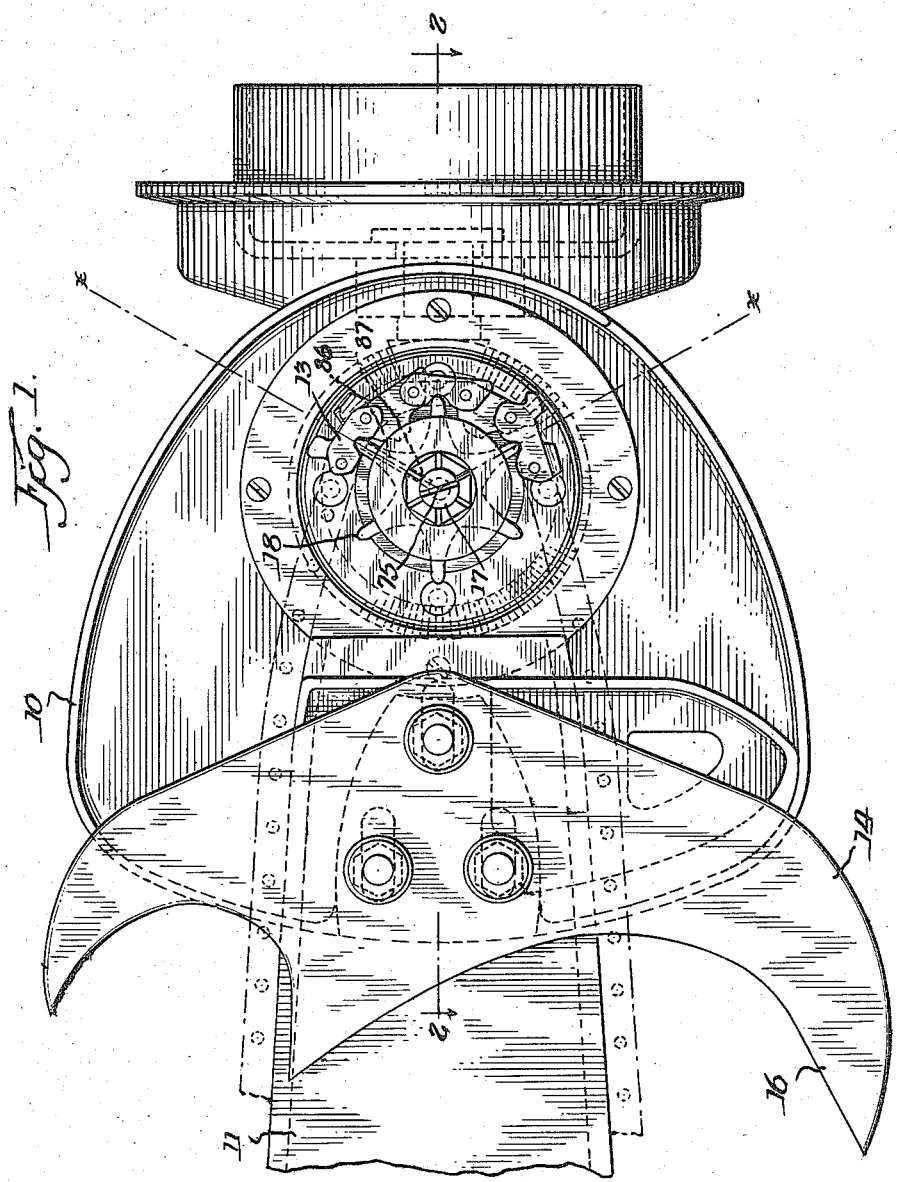

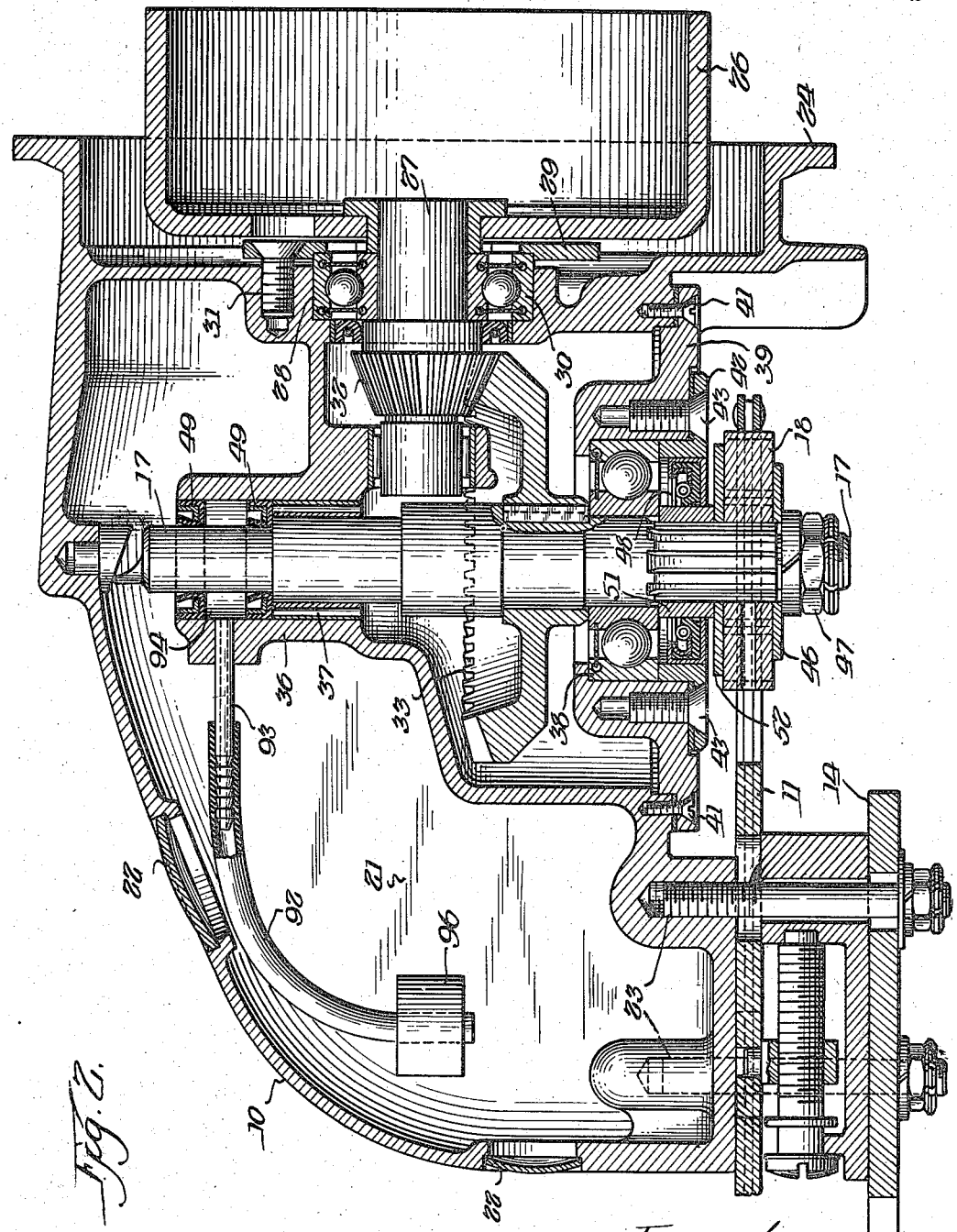

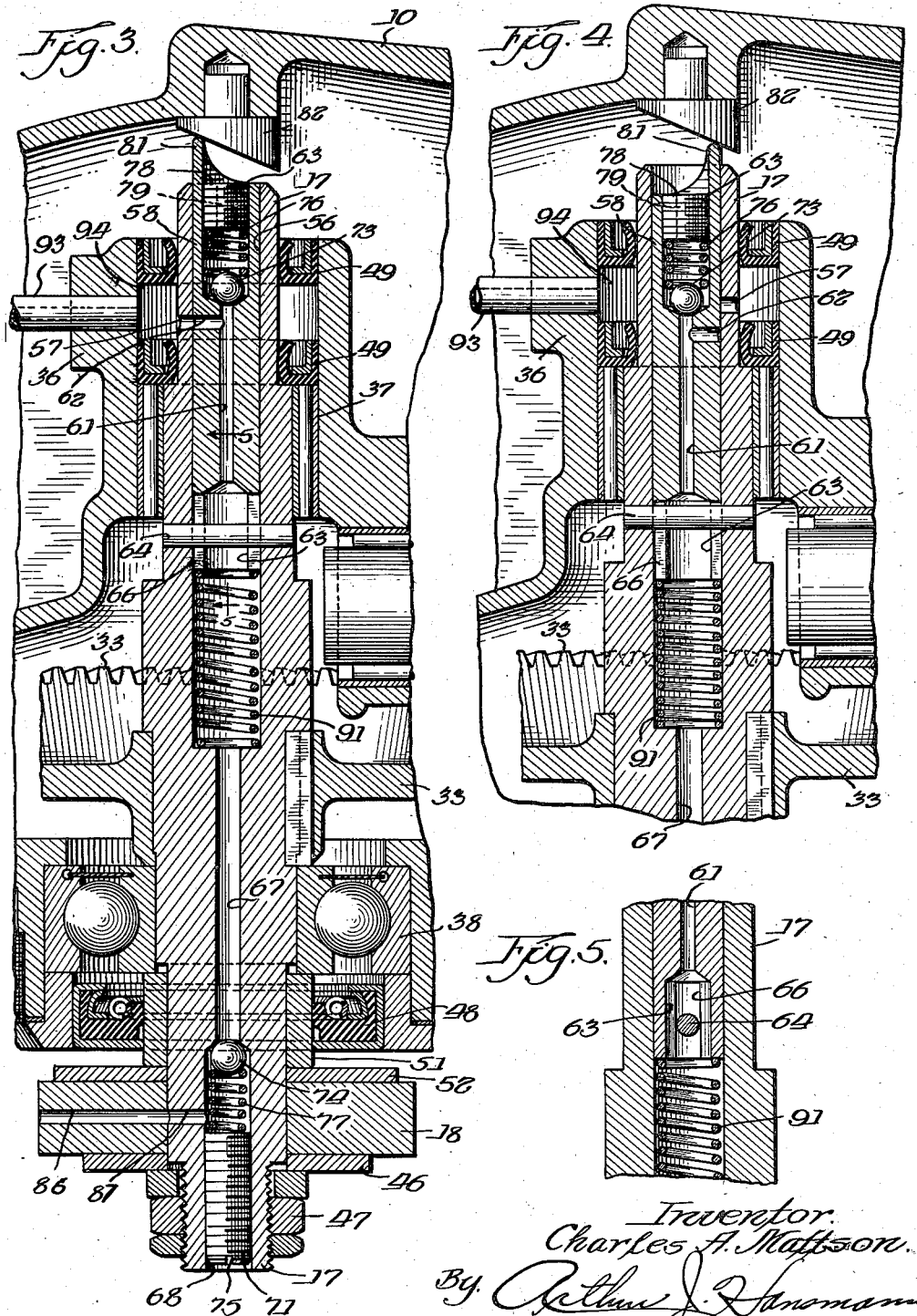

C. A. MATTSON 2,883,000

AUTOMATIC CHAIN OILER FOR CHAIN SAW

Original Filed Feb. 17, 1953

Inventor.
Charles A. Mattson.
By Arthur J. Hausmann
Atty.

United States Patent Office 2,883,000
Patented Apr. 21, 1959

2,883,000

AUTOMATIC CHAIN OILER FOR CHAIN SAW

Charles A. Mattson, Chicago, Ill., assignor, by mesne assignments, to Remington Arms Company, Inc., Bridgeport, Conn., a corporation of Delaware Continuation of application Serial No. 337,288, February 17, 1953. This application October 15, 1956, Serial No. 616,072

13 Claims. (Cl. 184—15)

This invention pertains to an automatic oiling device, and, more particularly, it pertains to an automatically operated oiling device for use in a rotary power transmission unit such as a chain saw transmission.

This application is a continuation of my copending application, Serial No. 337,288, filed February 17, 1953 (now abandoned) which in turn was a continuation of application Serial No. 272,995, filed February 23, 1952 (also now abandoned).

An application of this invention is shown and described in connection with a gasoline engine chain saw unit wherein this invention is especially useful. In the operation of any chain saw of the well known types, the most efficient operation depends upon proper lubrication of the chain and the contacting elements. Heretofore, the means of applying a lubricating oil to the chain has been primarily a manually operated oiling device. This device is not satisfactory for several reasons, such as the inconvenience to the saw operator who is required to operate the oiler while he simultaneously holds and operates the saw, frequently using both hands on the saw. The lubricant is therefore not always applied at the time it is needed, thus causing periods of saw operation without proper lubrication. Also, the presently known lubricating mechanisms have parts which project from the transmission housing to be accessible to the saw operator but subject to damaging forces and possible clogging by foreign matter. This also adds weight and bulk to the chain saw and, therefore, renders it less useful since a light weight saw is indispensable to the modern chain saw. Further, the lubricant is not applied directly to the point where it is most needed in the operation of the chain as the oil is placed on the top portion of the chain rather than the base portion which rides in the guide plate groove.

In addition to the foregoing, there also exists in the prior art means for automatically applying the necessary lubricating oil to the chain. An example of this prior art is shown in Fig. 7 of U.S. Patent 2,184,461 wherein an automatic oiler is described to operate off a shaft eccentric so that each shaft revolution releases oil through a check valve to the chain. However, the prior art oilers are not practical for reasons such as cumbersomeness, which increases both weight and volume of the chain saw; lack of adjustability in the amount of oil applied; and the lubricating device is located in the tail stock of the saw and not in the transmission. New cutting techniques have eliminated the necessity of using a tail stock.

Consistent with the foregoing comments, it is an important object of this invention to provide a chain saw lubricating device which is automatically operated with the operation of the chain saw.

Another important object is to provide an automatically operated chain saw lubricating device which supplies a predetermined amount of lubricating oil to the chain at predetermined intervals.

Still another object of this invention is to provide a chain saw lubricating device which is disposed entirely within the transmission housing thereby avoiding the projection of parts from the saw.

An additional important object is to provide an automatically operated chain saw lubricating device which is adjustable and can be readily adjusted without any disassembling of parts.

Still a further object of this invention is to provide an automatically operated chain saw lubricating device which is simple and inexpensive in construction and can be readily removed from its assembled position.

Another object is to provide a chain saw chain oiler device which applies the lubricating oil directly to the surface requiring it, i.e., the base portion of the chain.

Other objects and advantages will become more readily apparent upon reading the following disclosure in light of the accompanying drawings, in which, Fig. 1 is a fragmentary view of a portion of a chain saw wherein this invention is disposed.

Fig. 2 is a sectional view taken on the line 2—2 of Fig. 1.

Fig. 3 is a horizontlal enlarged sectional view taken through a portion of Fig. 2 and showing a preferred embodiment of this invention.

Fig. 4 is a sectional view similar to that shown in Fig. 3 but showing a different position of the mechanism.

Fig. 5 is a sectional view taken on the line 5—5 of Fig. 3.

Similar reference numerals refer to similar parts throughout the several views.

Figure 6:
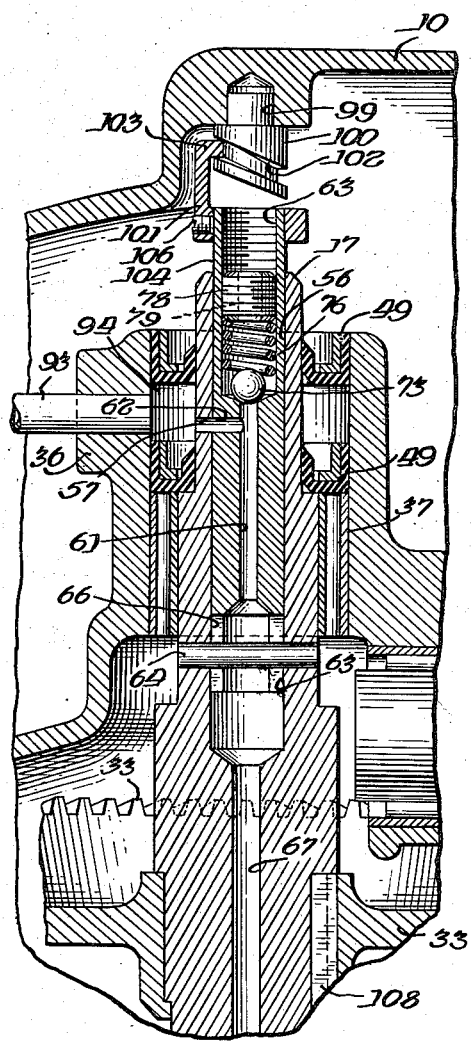
Fig. 6 is a sectional view similar to that of Fig. 3 but showing a modification of this invention.

As shown in Fig. 1, the main parts viewed therein are the conventional mechanism of a gasoline engine driven chain saw, but the view is included to assure a complete disclosure of this invention. Thus, there is generally shown a transmission housing 10 having a chain saw guide plate 11 mounted on the forward end while a gasoline engine unit (not shown) would be mounted on the rearward end in a conventional manner. The guide plate 11 is bolted to the forward end of the housing 10 and provides the track for guiding the travel of a continuously formed saw chain 13 which is wrapped therearound. A bracket member 14 is bolted with the guide plate 11 to the housing 10 whereby the bracket teeth 16 can bite into the workpiece, usually a tree or log, and control the saw during its operation.

It will be further noted in Fig. 1 that a shaft 17 is rotatably mounted in the housing 10 to project therefrom and have a sprocket 18 preferably splined onto the projecting end of shaft 17 to be non-rotatable therewith. The chain 13 is engaged partially around the sprocket 18 to permit rotation of the latter to drive the chain on the guide plate 11. The periphery of the guide plate is provided with a conventional groove wherein the base of the chain travels, thereby providing the primary frictional contact for which the lubricant is required.

Thus, the foregoing describes a generally conventional means of arranging the chain saw engine unit, the transmission unit, and the chain and guide plate to effect rotation of the shaft 17 and sprocket 18 and thereby drive the chain in a continuous and desired operation.

The view shown in Fig. 2 comprises the transmission housing 10 shown to include an oil reservoir portion 21 which is fluid tight by means of two plugs 22 being threaded therein. Again the forward end of the housing 10 shows the means for mounting the guide plate 11 and the bracket 14 thereon through bolts 23 engaging the housing. The rearward portion of the housing 10 contains an integral flange 24 through which the housing is clamped to the engine unit in the usual manner. Also, as seen in the rearward housing portion, adjacent the engine unit, a clutch drum 26 is mounted on a shaft 27 which in turn is rotatably mounted in the housing 10, by means of two bearings 28 and 30, in the usual manner. The bearing 28 is secured to the transmission with a retainer member 29 abutting the bearing and a plurality of screws 31 fastening the retainer 29 to the housing 10. The outer end of shaft 27 is preferably threaded to connect to the clutch drum 26 which thereby transmits rotation to the shaft 27. An intermediate portion of the shaft 27 has a bevel gear 32 keyed thereon to mesh with a bevel gear 33 which is keyed to the main transmission shaft 17 to rotate the latter.

The shaft 17 is supported in the housing 10 by means of an inner housing wall portion 36 which is provided with an opening to receive a shaft bearing member 37. The outer end portion of shaft 17 is supported by a bearing member 38 which is positioned within a cover 39 secured to the housing 10 by a plurality of screws 41 engaging the housing. A retainer member 42 is fastened to the cover 39 by screws 43 and thereby retains the bearing 38 in position.

It will be understood that the outer end portion of shaft 17 is preferably splined to receive the sprocket 18 in a driving relation as the latter member is secured to the shaft by a washer 46 and a nut 47 which is threaded onto the shaft 17. The usual spacer 51 and washer 52 are provided on the shaft 17 inside the sprocket 18 to space the latter from the retainer 42. The end portions of shaft 17 are provided with fluid seal members 48 and 49 to prevent fluid, either oil or air, from passing along the exterior of the shaft.

The foregoing describes a conventional construction of a transmission as commonly employed in a chain saw, while the following deals with the essence of this invention.

Referring to the shaft 17 as shown in Fig. 3, it will be noted that the shaft is provided with an axial bore 56 at its inner end portion and a transverse opening 57 extending through the side of the shaft 17 to communicate with bore 56. It should be noted that opening 57 is located between two preferably annular fluid seal members 49. Snugly disposed within bore 56 is a pump element, such as a piston or plunger member 58, which is free to move axially within the bore while it effectively seals between the bore 56 and the piston external surface to prevent air or oil from passing therearound. The piston 58 is further provided with an axial opening 61, extending along a central portion, and a transverse opening 62 in communication with opening 61. Thus, it will be apparent from Fig. 3 that the transverse openings 57 and 62 of the shaft 17 and the piston 58, respectively, are located to align when the shaft 17 is in a particular position of operation, such as that shown in Fig. 3, and thereby provide a flow passage from outside the shaft 17 to the inside thereof and to the axis of the piston 58.

Opposite ends of the piston 58 are shown to be provided with enlarged axial bores 63 which communicate with the piston opening 61. Through one of the piston bores 63, the shaft 17 is provided with a pin 64 to extend therethrough and across the piston 58 at an end portion provided with a slot 66 in the piston 58. Thus, as better shown in Fig. 5, the shaft 17 and the piston 58 are in rotary driving relation by the arrangement of pin 64 passing through the slot 66, while an axial movement of the piston 58 relative to the shaft 17 is possible.

The other end section of the shaft 17 contains an axial opening 67 which extends from the bore 56 to the end of the shaft 17 where a shaft bore 68 is provided to align with the opening 67. Bore 68 contains an internally threaded portion to receive a plug 71 which renders the shaft end fluid tight.

Thus, it will be noted that a continuous flow passage is provided from the shaft and piston transverse openings 57 and 62, respectively, to the piston openings 61 and 63, to the shaft bore 56 and to the shaft opening 67 and the shaft bore 68. The means for effecting the flow of lubricating oil along the above referred to passage is preferably as described hereinafter.

As shown in Fig. 3, two oppositely disposed ball check valves 73 and 74 are located at opposite end portions of the shaft 17 with valve 73 being located at the outer end of the piston opening 61 and valve 74 being located at the outer end of shaft opening 67. The valves 73 and 74 are provided with coil springs 76 and 77, respectively, which yieldingly urge the valves to their seats as shown in the position in Fig. 3. A spring stop 78 is threaded into the outer end portion of the piston 58 to support the spring 76 in its position. The stop 78 contains an axial opening 79 to permit fluid passing through the valve 73 to pass from the piston end. Also, the plug 71 in the opposite end of shaft 17 serves as a support for the spring 77 which acts against the valve 74. In connection with this arrangement, it should be noted that the plug 71 is readily available from the exterior of the transmission housing as shown in Fig. 1, and it can be easily adjusted by means of a screwdriver slot 75, to provide the desired action of the valve 74 by regulating the compression on spring 77. By relative adjustment of the spring forces which must be overcome before oil will pass through the respective check valves 73 and 74, it is possible to control the proportion flowing through each valve with reference to the total amount to be discharged with each pumping stroke. Thus, in this invention, an adjustment is simply provided for controlling the relative proportion of oil which will pass through valve 74 as the plunger descends.

Referring again to Fig. 3, it will be apparent that during the operation of the saw, the shaft 17 is rotated through gear 33 thereby rotating the piston 58 through the pin 64. As the piston rotates, a piston projecting end portion 81 acts as a follower on an adjacent cam member 82 which is circular in cross sectional shape and pressed into the transmission housing 10. Thus, the cam 82 has a flat face surface which is inclined to the axis of rotation of the piston 58 and causes the piston to be axially displaced toward the center of the shaft 17 to the position shown in Fig. 4 upon 180 degree rotation from the position shown in Fig. 3.

In moving from the position shown in Fig. 3 to the position shown in Fig. 4, fluid present between the check valves 73 and 74 will be forced therefrom in an amount substantially equal to the amount of fluid drawn into the bore at the end of the piston's reciprocation cycle—that is, during the instant when the transverse passage 62 of the piston communicates with transverse opening 57. Since the diameter of opening 57 is substantially less than the diameter of bore 56 (Figs. 3 and 4), and since fluid is drawn into the bore only at the moment when the transverse openings of the shaft and reciprocable piston are in direct communication, it is apparent that the volume of fluid pumped during a single pumping stroke of the piston will be substantially less than the displacement of that piston. Depending upon either the relative strength of springs 76 and 77, or upon the preloading of these springs by their respective support members, the relative pressure responsiveness of the valves and hence the proportionate quantity of fluid passing through each valve is regulated in relation to the total fluid pumped. Fluid passing through the valve 74 enters the shaft bore 68 where it passes to a transverse shaft opening 87 which is in constant communication with a passage 86 extending radially in the sprocket 18.

It should thus be understood that the piston executes its pumping stroke during a 180 degree angle of rotation of the shaft 17, and that lubricant is discharged from the sprocket 18 and onto the chain 13 along an arc of rotation substantially less than 180 degrees. The exact timing of the lubricant discharge can be varied as desired but is preferably as shown in Fig. 1 to cover the smaller segment of rotation between the lines designated X.

Upon the continued rotation of the shaft 17 from the position shown in Fig. 4 to the position shown in Fig. 3, a coil spring 91, which is positioned within the shaft bore 56 and abuts the piston 58, urges the latter outwardly against the cam 82. This piston return action creates a slight vacuum in the passage between check valves 73 and 74. Then, as the piston opening 62 approaches alignment with the opening 57, oil is educted from the reservoir 21 through a flexible tube 92, shown in Fig. 2, and the nipple 93 which is in communication with the chamber 94 between the two annular seals 49. The oil then passes into the passage between the check valves 73 and 74 to relieve the vacuum created therein and to restore the original condition prior to another pumping stroke of the piston 58.

To assure continuous contact of the tube 92 with the oil in the reservoir 21, it is preferred that a free weight 96 be placed on the end of the tube 92 to maintain the tube end submerged in oil regardless of the position of the transmission housing 10 or the level of the oil in the reservoir 21.

Obviously, from the foregoing description it should be realized that variations exist within the scope of that disclosure. One such variation is the elimination of check valve 73 and the fluid passage upon which it operates, such as passage 79. Then the oil in shaft bore 56 would be pumped therefrom through the valve 74 without the return flow through valve 73.

Figure 7:
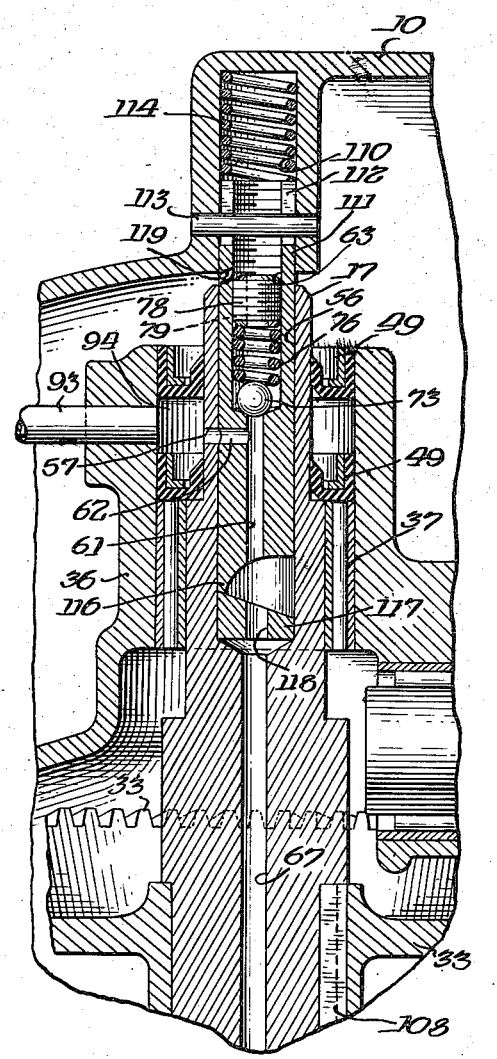
Fig. 7 is a sectional view similar to that of Fig. 3 but showing a further modification of this invention.

Further modifications of the foregoing invention are shown in Figs. 6 and 7. Here the parts, corresponding to those of the foregoing, are referenced with the same numbers.

The modification shown in Fig. 6 consists generally of the elimination of the spring 91 of Figs. 3 and 4, and the provision of a cam and a follower which replace the function of the spring by positive actuation of the piston upon rotation of the shaft 17. In Fig. 6, transmission housing 10 is slightly modified from that shown in Fig. 3 in order to accommodate the modified cam 100 and follower 101. Cam 100 is preferably pressed into opening 99 of housing 10 and is provided with a helical groove 102 which receives end portion 103 of follower 101.

It should be noted that pump piston 104 is also slightly modified from piston 58 so that the projecting end thereof is clamped to follower 101 by set screw 106 or similar means. The piston 104 and follower 101 are thus relatively non-rotatably secured together. Piston 104 is fluid tightly disposed within shaft bore 56 to be axially movable therewithin but relatively non-rotatable with shaft 17 by virtue of pin 64 in slot 66.

The operation of the construction of Fig. 6 is such that upon rotation of shaft 17 by gear 33 and through key 108, the cam 100 and follower 101 act to move piston 104 axially as pin 64 rotates piston 104. This effects the fluid pumping operation as previously described. Upon rotation of 180 degrees from the position shown in Fig. 6, to that shown in Fig. 4, the oil inlet 57 is closed and fluid is pumped through piston bore 61 in either direction depending upon the outlet adjustment.

Fig. 7 shows a further modification of the invention shown in Figs. 3 and 4. Here the piston is maintained non-rotatable but axially movable. The housing 10 is altered from that previously described to provide a circular bore 110 aligned with shaft 17. Pump piston 111 is snugly fitted within shaft bore 56 to be axially movable therewithin. Piston 111 extends from shaft 17 to project within bore 110. The end of piston 111 contains a slot 112, similar to slot 66 shown in Fig. 5. Slot 112 receives transversely extending pin 113 which is rigidly mounted in housing 10. Pin 113 then maintains piston 111 in a non-rotatable position while permitting axial movement of the same.

Positioned between the base of bore 110 and the end of piston 111 is a compression spring 114 which urges piston 111 into shaft bore 56. The opposite end of piston 111 contains a cam follower 116. Adjacent this end is a cam 117 preferably pressed into shaft bore 56 and provided with a fluid passage 118. Thus, it should be understood that spring 114 and cam 117 govern the axial movement of piston 111.

Upon rotation of shaft 17, piston 111 is maintained non-rotatable by pin 113. However, cam 117 rotates with shaft 17, and, therefore, permits spring 114 to axially move piston 111 downwardly from the position shown in Fig. 7. This effects the closing of inlet 57 and the fluid pumping stroke, passing fluid through bores 61, 118 and 67. Depending upon the adjustment of the valves 73 and 74, fluid will also pass through bores 61, 63, and 79, and then through transverse opening 119 in piston 111 to permit the oil to return to the reservoir 21.

Although this invention has been described in a specific embodiment, it should be understood that numerous changes can be made within its scope, and this invention should, therefore, be limited only by the appended claims.

I claim:

1. In a chain saw having a driven shaft equipped with a chain driving sprocket mounted thereon, said sprocket being provided with a passage extending inwardly from the periphery thereof, said shaft providing an axially extending bore therein and providing a passage in communication with said bore and said sprocket passage, check valve means provided by said shaft for permitting the flow of oil from said bore to said sprocket and for preventing oil flow in the opposite direction, oil reservoir means provided by said chain saw, passage providing means extending from said reservoir to said shaft, said shaft having a port in the wall thereof communicating with said bore and with said passage providing means, a plunger reciprocably mounted within said bore for driving oil to said sprocket passage from said bore, said plunger being arranged to close said port during all of its reciprocation cycle except when said plunger is substantially at the end of said cycle, said port being sufficiently smaller in diameter than said bore so that at substantially the end of each plunger cycle said bore receives an increment of oil from said reservoir substantially less than the amount which would cause said plunger to discharge oil to said sprocket throughout its full stroke away from said port, and means for reciprocating said plunger in timed sequence with the rotation of said shaft and sprocket, whereby the period of oil discharge through said sprocket passage can be confined to the interval during which said sprocket passage is in direct oil discharging relation with said chain.

2. The structure of claim 1 in which means are provided for preventing rotation of said plunger with reference to said chain saw and for permitting reciprocation of said plunger within the bore of said rotatable shaft.

3. The structure of claim 1 in which means are provided for constraining said plunger for rotation with said shaft while permitting said plunger to reciprocate within said bore.

4. The structure of claim 3 in which the means for reciprocating said plunger upon rotation of said shaft comprises a cam member having a cam surface angled with reference to the axis of shaft rotation, said plunger being provided with a cam rider portion adapted to engage said angled cam surface, and means biasing said plunger so that said rider portion is in constant engagement with said angled cam surface.

5. The structure of claim 3 in which the means for reciprocating said plunger upon rotation of said shaft comprises a cam member having a continuous cam groove extending along a plane angled with reference to the axis of shaft rotation, said plunger being provided with a cam rider portion adapted to ride within said groove for reciprocating said plunger upon rotation of said shaft with reference to said cam member.

6. In a chain saw having a driven shaft equipped with a chain driving sprocket mounted thereon, said sprocket being constructed and arranged to contact a saw chain along an arc of its periphery of substantially less than 180° and having a passage extending centrally towards the sprocket's rotational axis from the periphery thereof, said shaft providing an axial bore therein and having a passage communicating with said sprocket passage and said bore, check valve means provided by said shaft for permitting lubricant flow from said bore towards said sprocket and for retarding the flow of lubricant in the opposite direction, a lubricant reservoir providing means mounted on said chain saw adjacent said shaft, passage providing means extending from said reservoir to said shaft, said shaft providing a port in a wall thereof adjacent said bore, a plunger reciprocably mounted within said bore for axial movement between an inner and an outer position, said plunger being arranged to cover said shaft port during all of its reciprocation cycle except when said plunger is near its outer position, said port being in open communication with said bore when said port is uncovered by said plunger, said port being sufficiently smaller in diameter than said bore so that as said plunger nears its outer position said bore receives an increment of lubricant from said reservoir substantially less than the amount which would cause said plunger to discharge lubricant to said sprocket through its full stroke towards said inner position, and means for reciprocating said plunger in timed sequence with the rotation of said shaft and sprocket, whereby the period of lubricant discharge through said sprocket passage can be confined to the portion of each sprocket revolution during which said sprocket passage is in direct lubricant discharging relation with said chain.

7. The structure of claim 6 in which said reciprocable plunger is provided with a flow passage therethrough in constant communication with said bore and in communication with said port only when said plunger is near its outer position.

8. The structure of claim 6 in which said passage providing means includes a pair of annular fluid seal bearing members extending about said shaft on opposite sides of said port, said fluid seal members being spaced apart and defining an annular chamber about said shaft in constant communication with said port.

9. The structure of claim 6 in which means are provided for preventing rotation of said plunger with reference to said chain saw and for permitting reciprocation of said plunger within the bore of said rotatable shaft.

10. The structure of claim 6 in which means are provided for constraining said plunger for rotation with said shaft while permitting said plunger to reciprocate within said bore.

11. In a chain saw having a driven shaft equipped with a chain driving sprocket mounted thereon, said sprocket being provided with a passage extending centrally from the periphery thereof, said shaft providing an axially extending bore therein and having a passage communicating with said sprocket passage and said bore, oil reservoir means provided by said chain saw, passage providing means extending from said reservoir to said shaft, said shaft having an opening in the wall thereof for placing said passage providing means and said bore in communication, a plunger reciprocably mounted within said bore for driving oil from said bore to said sprocket passage, said plunger being provided with an internal flow passage having a peripheral inlet alignable with said shaft opening and having outlets at the ends thereof communicating with said bore at opposite ends of said plunger, said plunger being adapted to close said opening of said shaft during all of its reciprocation cycle except when the passage inlet of the same is in direct communication with said opening, a first check valve provided by said shaft between said sprocket passage and said plunger for permitting the flow of oil from said bore to said sprocket passage and for preventing oil flow in the opposite direction, a second check valve provided by said plunger for controlling the flow of oil through the axial passage of said plunger in a direction away from said sprocket, means cooperating with said check valves to adjust the same for regulating the relative proportion of oil passing through the respective check valves upon reciprocation of said plunger, and means for reciprocating said plunger in timed sequence with the rotation of said shaft and sprocket.

12. The structure of claim 11 in which means are provided for constraining said plunger for rotation with said shaft while permitting said plunger to reciprocate within said bore.

13. The structure of claim 11 in which means are provided for preventing rotation of said plunger with reference to said chain saw and for permitting reciprocation of said plunger within the bore of said rotatable shaft.

References Cited in the file of this patent

UNITED STATES PATENTS

| | | |
|---|---|---|
| 766,756 | Chapman | Aug. 2, 1904 |
| 807,731 | Dodge | Dec. 19, 1905 |
| 1,445,285 | Borgo | Feb. 13, 1923 |

FOREIGN PATENTS

| | | |
|---|---|---|
| 231,756 | Great Britain | Apr. 9, 1925 |